United States Patent
Kim et al.

(10) Patent No.: US 9,360,371 B2
(45) Date of Patent: Jun. 7, 2016

(54) SENSOR UNIT

(71) Applicants: Hyundai Motor Company, Seoul (KR); Korea University Research and Business Foundation, Seoul (KR)

(72) Inventors: Hyunsang Kim, Gyeonggi-do (KR); Suki Kim, Seoul (KR); Sanghyeok Yang, Suwon (KR); Woohyun Paik, Seoul (KR); Hoyoung Park, Seoul (KR)

(73) Assignees: Hyundai Motor Company, Seoul (KR); Korea University Research and Business Foundation, Seoul (KR)

( * ) Notice: Subject to any disclaimer, the term of this patent is extended or adjusted under 35 U.S.C. 154(b) by 318 days.

(21) Appl. No.: 13/711,084

(22) Filed: Dec. 11, 2012

(65) Prior Publication Data
US 2014/0110580 A1     Apr. 24, 2014

(30) Foreign Application Priority Data
Oct. 19, 2012 (KR) .................. 10-2012-0116825

(51) Int. Cl.
*G01J 5/02* (2006.01)
*G08B 13/181* (2006.01)
*B60R 21/013* (2006.01)
*G01P 15/00* (2006.01)
*B60R 21/0134* (2006.01)
*B60R 21/0136* (2006.01)

(52) U.S. Cl.
CPC ................ *G01J 5/02* (2013.01); *G08B 13/181* (2013.01); *B60R 21/013* (2013.01); *B60R 21/0134* (2013.01); *B60R 21/0136* (2013.01); *G01P 15/00* (2013.01)

(58) Field of Classification Search
USPC ........................................ 250/338.1
See application file for complete search history.

(56) References Cited

U.S. PATENT DOCUMENTS

| | | | | |
|---|---|---|---|---|
| 3,789,674 A | * | 2/1974 | Anderson | G01P 15/093 250/231.1 |
| 4,737,630 A | * | 4/1988 | Andersson | G01P 15/093 250/231.1 |
| 5,055,671 A | * | 10/1991 | Jones | 250/227.21 |
| 5,218,420 A | * | 6/1993 | Asmar | G01P 15/093 356/480 |
| 5,291,014 A | * | 3/1994 | Brede | B60R 21/01 250/227.21 |

(Continued)

FOREIGN PATENT DOCUMENTS

| | | |
|---|---|---|
| JP | 2005053371 A | 3/2005 |
| KR | 10-1998-039407 | 8/1998 |
| KR | 10-0193673 | 2/1999 |

OTHER PUBLICATIONS

Hewlett Packard: Optical Reflective Sensors Technical Data, Copyright 1997, pp. 1-8.*

*Primary Examiner* — Christine Sung
(74) *Attorney, Agent, or Firm* — Mintz Levin Cohn Ferris Glovsky and Popeo, P.C.; Peter F. Corless

(57) ABSTRACT

The present disclosure provides a sensor unit that includes a mounting portion fixed on one side of the sensor unit; an elastic member including a first end and a second end, the first end being disposed on the mounting portion; a transmission portion configured to transmit a detectable signal, the transmission portion disposed on the second end of the elastic member; a reception portion configured to receive a reflection of the detectable signal; and a controller that determines whether the reflected signal indicates an impact, motion, or impending impact.

10 Claims, 7 Drawing Sheets

(56) References Cited

U.S. PATENT DOCUMENTS

| | | | | |
|---|---|---|---|---|
| 5,705,809 A * | 1/1998 | Kershaw | ............ | G01D 5/30 250/227.14 |
| 7,313,972 B2 * | 1/2008 | Reimer et al. | ............ | 73/800 |
| 7,554,674 B2 * | 6/2009 | Carr | ............ | G01D 5/266 356/35.5 |
| 7,653,214 B2 * | 1/2010 | Schroeder | ............ | G01P 15/003 382/103 |
| 2009/0241667 A1 * | 10/2009 | Chang | ............ | G01P 15/093 73/514.32 |
| 2011/0031921 A1 * | 2/2011 | Han | ............ | 318/483 |
| 2011/0181892 A1 * | 7/2011 | Ritter et al. | ............ | 356/614 |
| 2011/0292049 A1 * | 12/2011 | Muravsky | ............ | 345/440 |
| 2014/0076050 A1 * | 3/2014 | Wang | ............ | G01P 15/093 73/514.26 |

* cited by examiner

SENSOR UNIT

CROSS-REFERENCE TO RELATED APPLICATION

This application claims priority under 35 U.S.C. §119(a) to and the benefit of Korean Patent Application No. 10-2012-0116825, filed in the Korean Intellectual Property Office on Oct. 19, 2012, the entire contents of which are incorporated herein by reference.

BACKGROUND OF THE INVENTION (a) Field of the Invention

The present invention relates to a sensor unit, and more particularly, to a sensor that uses a transmitter to transmit a signal at a predetermined frequency (e.g., infrared light) and a receiver that receives the reflected signal to detect vibration, a contact, an approaching motion/movement, or an attempted theft/break in.

(b) Description of the Related Art

Generally, an impact detecting sensor uses an acceleration sensor (e.g., an accelerometer) to detect the variation of speed that is generated by an impact, which may then trigger an alarm. An impact in a random direction can be detected by using a conventional acceleration sensor. Unfortunately, it is difficult to use a conventional acceleration sensor to detect an approaching contact that does not result in an impact and thereby prevent impact damage to a vehicle.

An indoor motion detecting device for a vehicle can radiate ultrasonic waves throughout the interior of a vehicle by using an ultrasonic sensor and to detect the reflected ultrasonic waves. Unfortunately, such a conventional motion detecting device has several disadvantages. For example, this type of motion detecting device uses an ultrasonic wave sensor, which is expensive to produce and also requires a lot of power to operate. Additionally, because such conventional motion detecting devices are implemented in the interior of a vehicle, they cannot be used to detect an approaching contact on the outside of the vehicle. Accordingly, there is a need in the art for a sensor that will efficiently detect an impending contact to an exterior or interior surface of the vehicle surface of the vehicle, to aid in the prevention of a vehicle accident.

SUMMARY OF THE INVENTION

The present invention has been made in an effort to provide an inexpensive sensor unit having the ability to detect an impending contact to an exterior or interior surface of the vehicle, while having a structure that can be disposed on the interior or exterior of the vehicle, and that does not require high power consumption in order to operate.

A sensor unit according to an exemplary embodiment of the present invention may include a mounting portion that is fixed at one side, an elastic member of which one end thereof is fixed on the mounting portion, a transmission portion (e.g., a transmitter) that is disposed at the other end of the elastic member to radiate infrared signals, a reception portion (e.g., a receiver) that receives the infrared signals reflected from another random object, and a control portion that determines whether it is an abnormal or normal condition according to the characteristics of the infrared signal that is received by the reception portion.

The transmission portion may be movably disposed at one end of the elastic member to vary the direction that the infrared signal is radiated, if the mounting portion is moved or an impact is applied to the mounting portion.

The transmission portion may include an infrared LED that radiates infrared signals. The sensor unit may further include a transmission signal processing control portion that modulates the signal, and a LED driver that adjusts the modulated signal of the transmission signal processing control portion, wherein the infrared LED radiates the signal that is generated from the LED driver. The transmission signal processing control portion and the LED driver may be built in the mounting portion in an exemplary embodiment. The LED driver and the infrared LED may transfer signal through the elastic member.

The radiation surface of the transmission portion may be a lattice type, and the radiation surfaces respectively may have different radiation angle except the lattice portion.

The reception portion may include a photo diode that receives the infrared signal reflected from the random body/object, and an analog signal processing portion that receives the infrared signal of the photo diode to process the infrared signal, wherein the control portion determines whether there is an impact or an impending contact by using the signal that is processed by the analog signal processing portion.

The abnormal condition may include an impending impact condition, an impact condition, or an attempted theft/break in of the vehicle.

A sensor unit according to an exemplary embodiment of the present invention may include a casing in which a space is formed therein, a mounting portion that is fixed on one side of the space inside the casing, an elastic member of which one end thereof is mounted on the mounting portion, a transmission portion that is disposed at the other end portion of the elastic member to radiate infrared signal, a reflection body that is fixed on the other side of the space inside the casing, a reception portion that is disposed inside the casing to receive the infrared signal that is reflected from the reflection body, and a control portion that determines whether there is an impact or an invasion condition according to the characteristics of the infrared signal that is received by the reception portion, wherein the transmission portion is mounted to be shaken on the elastic member such that the radiation direction of the infrared signal that is radiated by the transmission portion is changed by the shake.

The reception portion may include a photo diode that receives the infrared signal reflected from the reflection body, and an analog signal processing portion that receives the infrared signal of the photo diode to process the infrared signal, wherein the control portion determines whether there is an impact or an invasion by using the signal that is processed by the analog signal processing portion.

The sensor unit according to an exemplary embodiment of the present invention may include a mounting portion that is fixed at one side, an elastic member of which one end thereof is fixed on the mounting portion, a transmission portion that is disposed at the other end of the elastic member to radiate a predetermined frequency length, a reception portion that receives the frequency length reflected from other random object, and a control portion that determines whether it is an abnormal condition according to the characteristics of the frequency length that is received by the reception portion.

The elastic member may be a coil spring type.

As described above, a sensor unit according to an exemplary embodiment of the present invention determines a vibration through an infrared transmission portion that is mounted at an end portion of an elastic member and simultaneously determines invasion through the infrared signals reflected from a random body.

DESCRIPTION OF SYMBOLS

Figure 1:
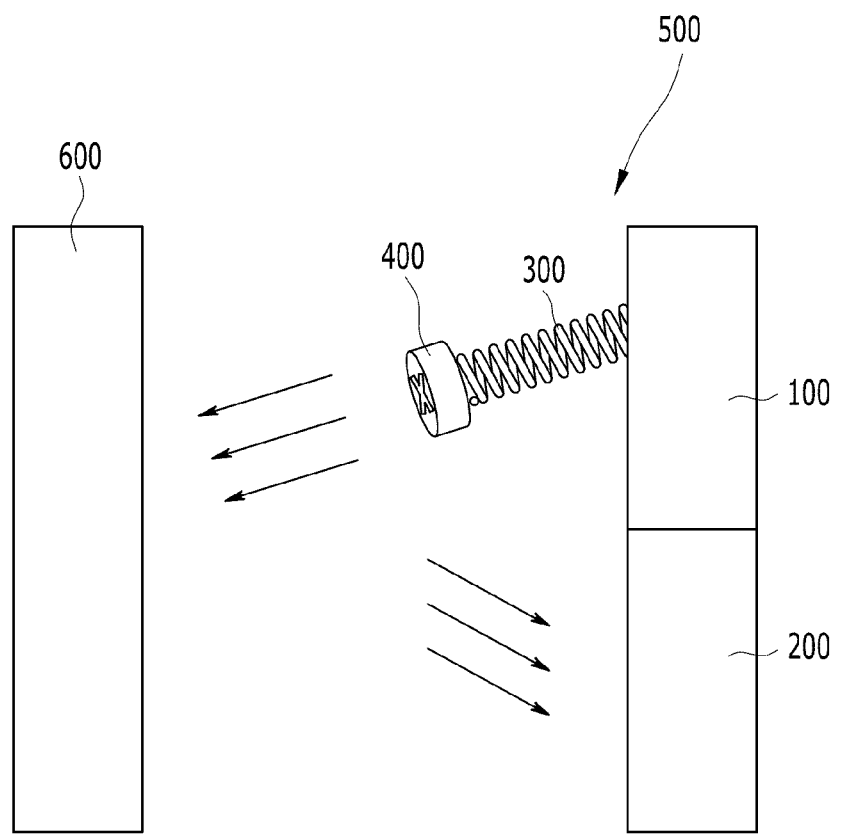
FIG. 1 is a schematic diagram of a sensor unit according to an exemplary embodiment of the present invention.

| | |
|---|---|
| 100: a mounting portion | 102: transmission signal processing control portion |
| 104: LED driver | 200: reception portion |
| 202: photo diode | 204: analog signal processing portion |
| 206: reception signal processing control portion | |
| 300: elastic member | |
| 400: transmission portion | 500: sensor unit |
| 510: vehicle | 600: random body |
| 610: reflection body | 620: casing |
| 700: lattice | 710: radiation surface |

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a schematic diagram of a sensor unit according to an exemplary embodiment of the present invention. A sensor unit 500 includes a mounting portion 100, a reception portion 200 (e.g., a receiver), an elastic member 300, and a transmission portion 400 (e.g., a transmitter). Further, there is a random body 600 that is disposed to reflect an infrared signal that is transmitted from the transmission portion 400. Here, the random body 600 may include a person, an object, an animal, and all components of a vehicle that can reflect the infrared ray.

As shown in the drawings, one end of the elastic member 300 may be fixed on the mounting portion 100 and the other end thereof may be connected to the transmission portion 400. The infrared signal that is transmitted from the transmission portion 400 may be reflected from the random body and the reception portion 200 receives the infrared signal that is reflected. While it is described that the transmission portion 400 radiates infrared signals in an exemplary embodiment of the present invention, is contemplated within the scope of the disclosure that the transmission portion 400 may transmit a light signal, a sound signal, an ultrasonic signal, any other suitable transmissible signal, and/or any combination thereof.

Figure 2:
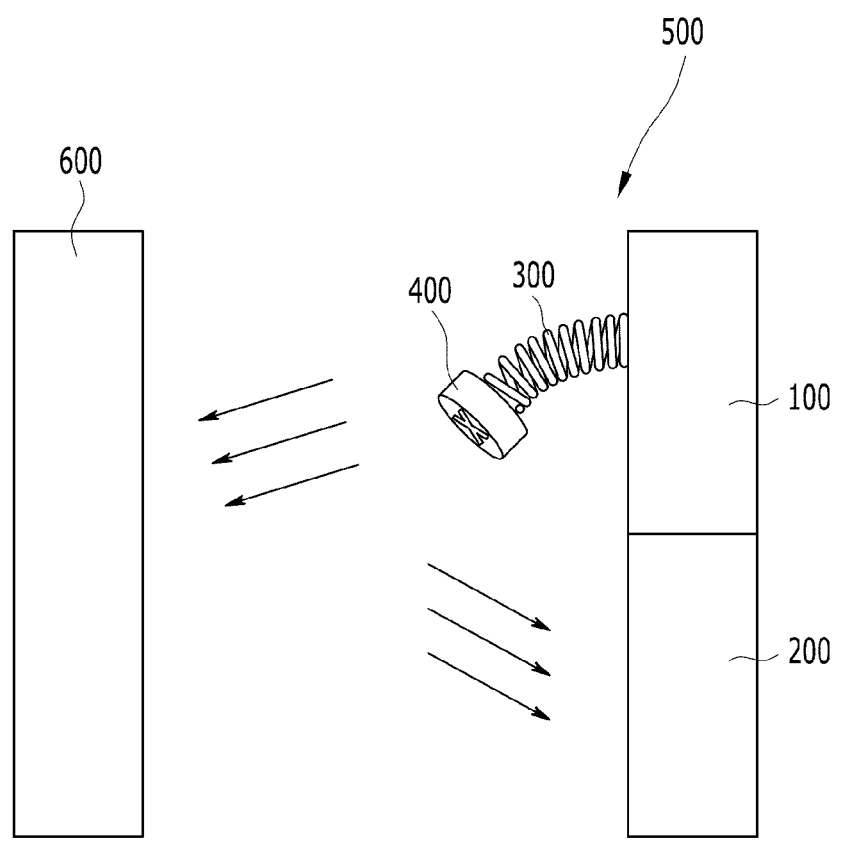
FIG. 2 is a schematic diagram showing a condition that a sensor unit according to an exemplary embodiment of the present invention may detect.

FIG. 2 is a schematic diagram showing a condition (e.g., an impact, an impending impact, a motion, an attempted theft/break in, etc.) that a sensor unit may detect when operated according to an exemplary embodiment of the present invention. Referring to FIG. 2, if an impact is applied to the sensor unit 500, the transmission portion 400 disposed on the elastic member 300 may be shaken/moved in up/down direction or left/right direction, and the characteristics of the infrared signal that is reflected from the random body 600 may be varied accordingly. Consequently, the reception portion 200 may detect the change of the characteristics of the infrared signal that is reflected.

Also, the sensor unit can detect an impact and a thief by detecting the change of the characteristics of the infrared that is reflected from the thief or the random body.

Figure 3:
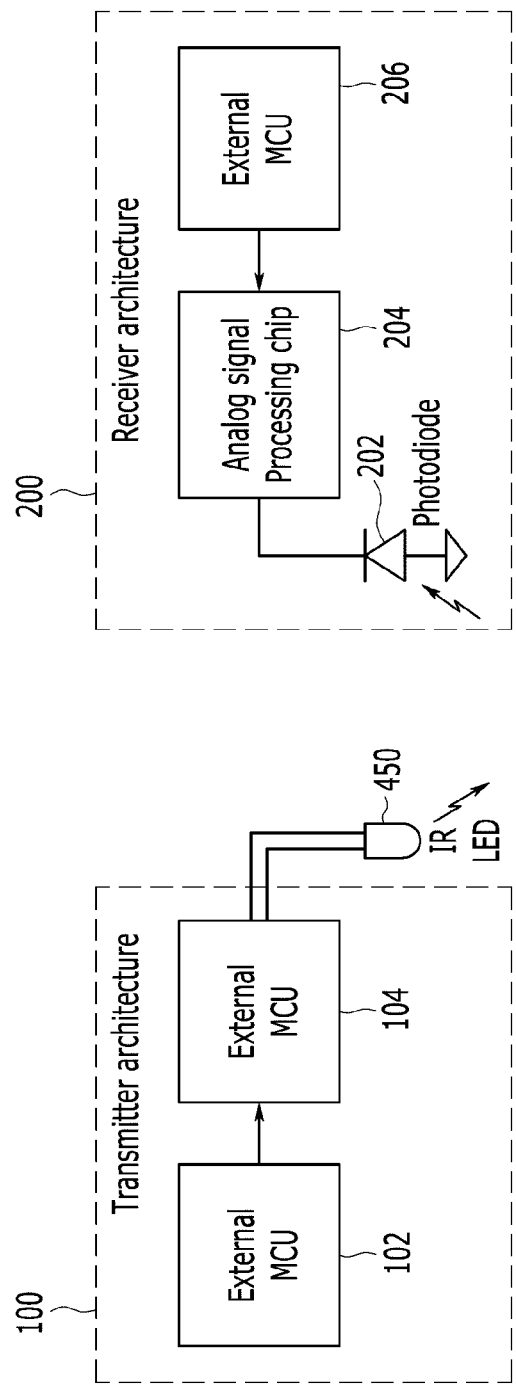
FIG. 3 is a schematic diagram showing in detail constituent elements of a sensor unit according to an exemplary embodiment of the present invention.

FIG. 3 is a schematic diagram showing in detail constituent elements of a sensor unit according to an exemplary embodiment of the present invention. A transmission signal processing control portion 102 and a LED driver 104 are built in the mounting portion 100, and the transmission portion 400 is a LED that transmits infrared signals depending on the signal that is transmitted from the LED driver 104.

The transmission signal processing control portion 102 modulates the signal, the LED driver 104 adjusts the level of the modulated signal, and the transmission portion 400 transmits infrared signals by using the adjusted signal.

The reception portion 200 includes a photo diode 202, an analog signal processing portion 204, and a reception signal processing control portion 206.

The photo diode 202 may substantially detect the infrared signal that is reflected to generate an analog signal, the analog signal may be processed by the analog signal processing portion 204, and the transmission signal processing control portion 102 may then determine whether there is an impact or an attempted theft.

It is described that the transmission signal processing control portion 102 is separated from the reception signal processing control portion 206, but it is not limited thereto and they may be made together in an exemplary embodiment of the present invention. Also, the transmission signal processing control portion 102 and the reception signal processing control portion 206 may be regarded as one control portion and it may be understood that one control portion can perform the respective functions. Further, it is described that the transmission signal processing control portion 102 and the LED driver 104 are built in the a mounting portion 100, but it is not limited thereto. Also, it is described that the photo diode 202, the analog signal processing portion 204, and the reception signal processing control portion 206 may be built in the reception portion 200, but it is not limited thereto.

Figure 4:
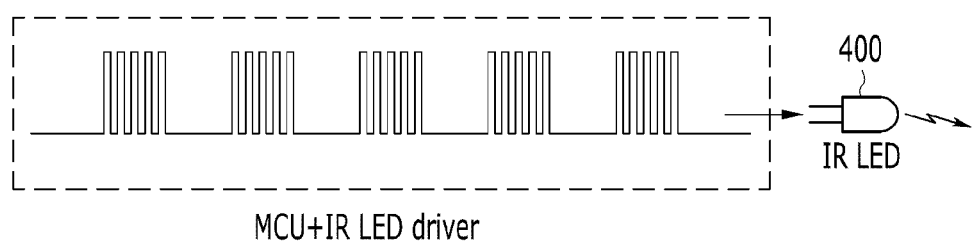
FIG. 4 is a graph showing a characteristics of a frequency that is radiated from a transmission portion of a sensor unit according to an exemplary embodiment of the present invention.

FIG. 4 is a graph showing the characteristics of a frequency that is radiated from a transmission portion of a sensor unit according to an exemplary embodiment of the present invention. Referring to FIG. 4, the transmission signal processing control portion 102 and the infrared ray LED driver 104 does not continuously transmit a uniform signal but generates signal only in a predetermined section with a regular cycle. Accordingly, overall consumed power can be saved and the sensitivity of the signal transmission and the signal reception can be increased.

Referring to FIG. 1 and FIG. 3, the elastic member can transmit electrical signal between the transmission portion and the infrared ray LED driver and the electrical signal can be wirelessly transmitted.

Figure 5:
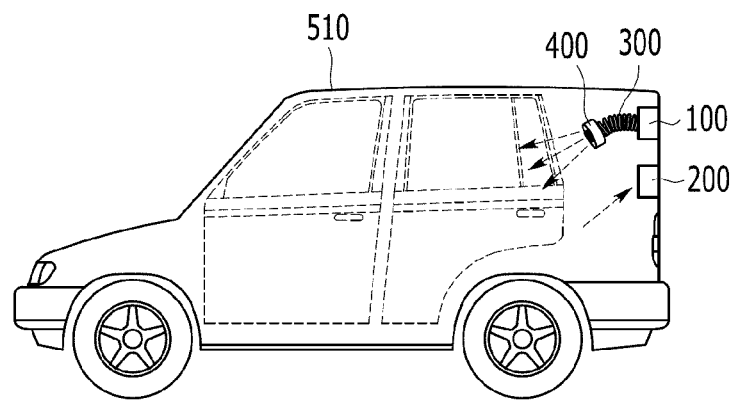
FIG. 5 is a schematic diagram showing a condition that a sensor unit is disposed in a vehicle according to an exemplary embodiment of the present invention.

FIG. 5 is a schematic diagram showing a condition that a sensor unit is disposed in a vehicle according to an exemplary embodiment of the present invention.

Referring to FIG. 5, a mounting portion 100, an elastic member 300, and a transmission portion 400 may be mounted inside a vehicle 510 and a reception portion 200 is mounted with a predetermined distance from the mounting portion 100.

It is described that the transmission portion 400 may be separated from the reception portion 200, but it is not limited thereto and they are disposed in one case in an exemplary embodiment of the present invention.

As shown in the drawings, if a thief invades the vehicle 510, the reflection characteristics of the infrared ray that is radiated from the transmission portion 400 may be changed, the LED signal that is received by the reception portion 200 is varied, and the control portion may determine whether there is an abnormal condition such as an attempted theft or an impact/contact.

Further, when an impact is applied from an outside of a vehicle in a condition that an invader does not invade into the vehicle 510, the transmission portion 400 is shaken to vary the radiation direction of the infrared ray that is radiated from the transmission portion 400, LED signal that is received by the reception portion 200 is varied, and the control portion can determine whether there is an abnormal condition such as an invasion or an impact.

Figure 6:
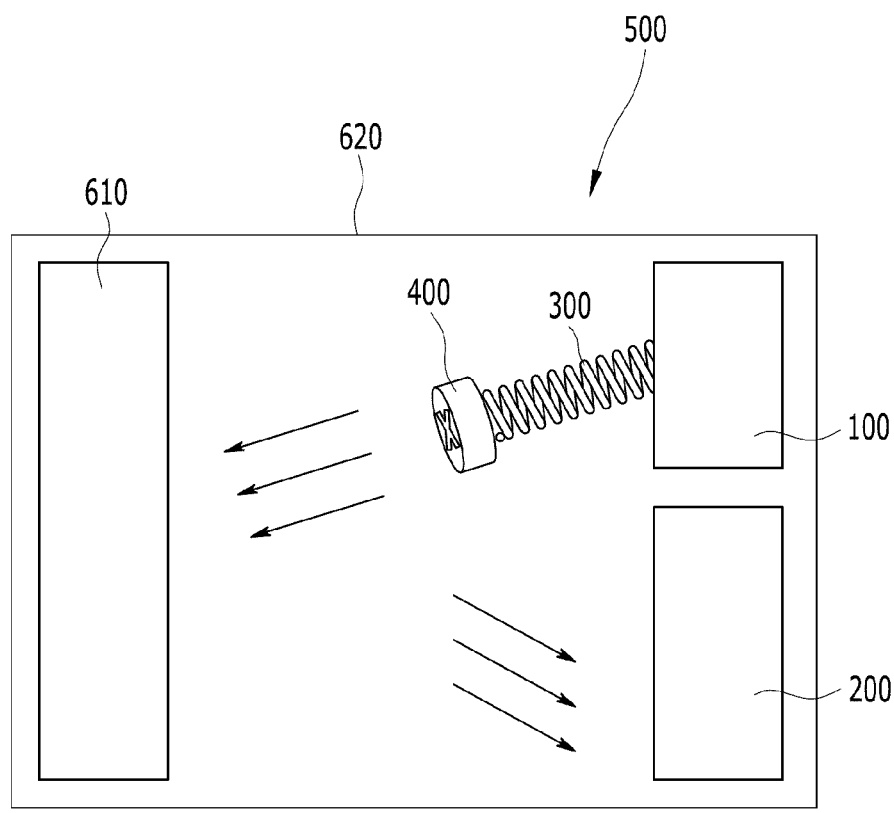
FIG. 6 is a schematic diagram of a sensor unit according to another exemplary embodiment of the present invention.

FIG. 6 is a schematic diagram of a sensor unit according to another exemplary embodiment of the present invention. The features of FIG. 6 compared with FIG. 1 and FIG. 5 will be mainly described. Referring to FIG. 6, the sensor unit 500 may include a casing 620, a reflection body 610, a mounting portion 100, an elastic member 300, a transmission portion 400, and a reception portion 200. The reflection body 610 is disposed inside the casing 620, and if an impact is applied to the casing 620, the transmission portion 400 may be shaken through the elastic member 300.

Accordingly, the reflection characteristics of the infrared signal that is radiated from the transmission portion 400 may be changed, the control portion may determine whether there is an abnormal condition such as an invasion and an impact according to LED signal that is received by the reception portion 200 is varied.

As described above, the reflection body 610, the transmission portion 400, and the reception portion 200 may be mounted inside the casing 620 with a predetermined distance from each other and therefore the impact can be accurately detected. Further, the reflection body 610 may be made up of a material that effectively reflects infrared ray.

Figure 7:
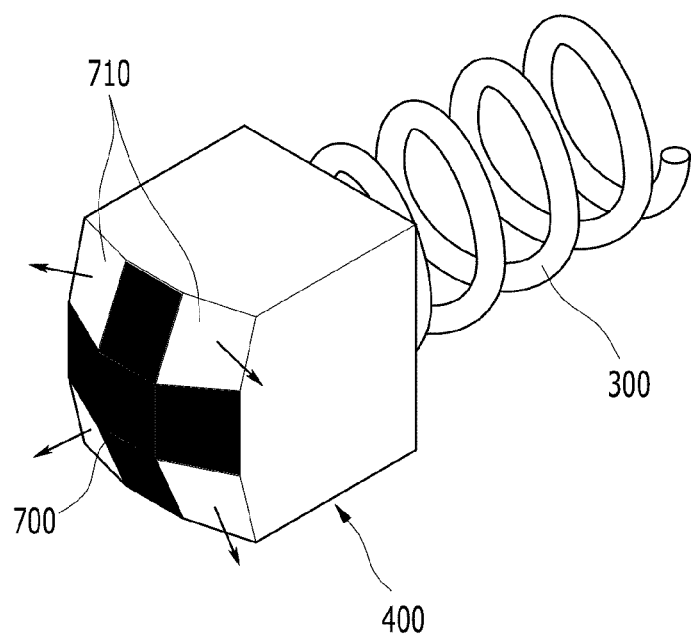
FIG. 7 is a partial perspective view of a sensor unit according to an exemplary embodiment of the present invention.

FIG. 7 is a partial perspective view of a sensor unit according to an exemplary embodiment of the present invention. Referring to FIG. 7, the transmission portion 400 may be engaged with an end portion of the elastic member 300 and a lattice of cross shape is formed at a front side of the transmission portion 400. Further, four radiation surfaces 710 may be formed by the lattice 700. Four radiation surfaces 710 have different radiation directions to be able to radiate the infrared ray in a further wide range.

Because ultraviolet ray is invisible and it is harmful to a user, it is not used, and because visible ray is visible, it is also not used in an exemplary embodiment of the present invention. Accordingly, the transmission portion radiates safe and invisible infrared signals. Further, an infrared LED is easy to control, and uses very little power.

Further, it is described that the elastic member has a coil spring type in an exemplary embodiment of the present invention, but it is not limited thereto. That is, the elastic member may include all kinds of type such as a plate spring and an elastic material that the transmission portion can be shaken.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sensor unit, comprising:
a mounting portion fixed on one side of the sensor unit on an interior wall of a vehicle;
an elastic member including a first end and a second end, the first end being disposed on the mounting portion;
a transmission portion configured to transmit a detectable signal, the transmission portion disposed on the second end of the elastic member;
a reception portion configured to receive a reflection of the detectable signal; and
a controller that determines whether the reflected signal indicates an impact, motion, or impending impact,
wherein the transmission portion includes an infrared LED that transmits an infrared signal, a transmission signal processing controller that modulates the infrared signal, and a LED driver that adjusts the modulated infrared signal of the transmission signal processing control portion and transmits the infrared signal via the infrared LED,
wherein the LED driver and the infrared LED transfer the infrared signal through the elastic member,
wherein a radiation surface of the transmission portion is a lattice type, and
wherein the lattice type radiation surface has one or more radiation surfaces configured to have one or more different radiation angles.

2. The sensor unit of claim 1, wherein the transmission portion is configured to move in response to the impact, motion, or impending impact.

3. The sensor unit of claim 1, wherein the transmission signal processing controller and the LED driver are disposed in the mounting portion.

4. The sensor unit of claim 1, wherein the reception portion includes:
a photo diode configured to receive an infrared signal reflected from a random body; and
an analog signal processing portion configured to receive the infrared signal of the photo diode to process the infrared signal, wherein the controller determines whether there is an impact or an invasion by using the signal that is processed by the analog signal processing portion.

5. The sensor unit one of claim 1, wherein the elastic member is a coil spring type.

6. A sensor unit, comprising:
a casing in which a space is formed therein;
a mounting portion fixed on one side of the space inside the casing on an interior wall of a vehicle;
an elastic member including a first end and a second end, the first end being disposed on the mounting portion;
a transmission portion disposed on the second end of the elastic member and configured to transmit a detectable signal at different angles;
a reflection body disposed on the other side of the space inside the casing relative to the mounting portion;
a reception portion that is disposed inside the casing and configured to receive the detectable signal that is reflected from the reflection body; and
a controller configured to determine whether the reflected signal indicates an impact, motion, or impending impact.

7. The sensor unit of claim 6, wherein the reception portion includes:
a photo diode configured to receive the detectable signal reflected from the reflection body; and
an analog signal processing portion configured to receive an infrared ray signal of the photo diode to process the infrared ray signal, wherein the control portion determines whether there is an impact or an invasion by using the signal that is processed by the analog signal processing portion.

8. The sensor unit one of claim 6, wherein the elastic member is a coil spring type.

9. A sensor unit, comprising:
a mounting portion fixed on one side on an interior wall of a vehicle;
an elastic member of which one end thereof is fixed on the mounting portion;
a transmission portion that is disposed at the other end of the elastic member to radiate a predetermined frequency length at different angles;
a reception portion that receives the frequency length reflected from other random object; and
a control portion that determines whether it is an abnormal condition according to the characteristics of the frequency length that is received by the reception portion.

10. The sensor unit one of claim 9, wherein the elastic member is a coil spring type.

* * * * *